US012131710B2

(12) United States Patent
Chen et al.

(10) Patent No.: US 12,131,710 B2
(45) Date of Patent: Oct. 29, 2024

(54) BACKLIGHT DRIVING METHOD AND DISPLAY DEVICE

(71) Applicant: TCL CHINA STAR OPTOELECTRONICS TECHNOLOGY CO., LTD., Guangdong (CN)

(72) Inventors: Xinhong Chen, Guangdong (CN); Yun Zhang, Guangdong (CN); Ling Xu, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/139,983

(22) Filed: Apr. 27, 2023

(65) Prior Publication Data

US 2024/0257771 A1 Aug. 1, 2024

(30) Foreign Application Priority Data

Jan. 31, 2023 (CN) ......................... 202310129322.5

(51) Int. Cl.
*G09G 3/34* (2006.01)
*G09G 3/20* (2006.01)

(52) U.S. Cl.
CPC ........... *G09G 3/342* (2013.01); *G09G 3/2007* (2013.01); *G09G 3/2092* (2013.01); *G09G 2310/08* (2013.01); *G09G 2320/0247* (2013.01); *G09G 2340/16* (2013.01)

(58) Field of Classification Search
CPC .... G09G 3/342; G09G 3/2007; G09G 3/2092; G09G 2310/08; G09G 2320/0247; G09G 2340/166
See application file for complete search history.

(56) References Cited

U.S. PATENT DOCUMENTS

| | | | | |
|---|---|---|---|---|
| 11,875,761 | B2 * | 1/2024 | Lee | G09G 5/18 |
| 2015/0356905 | A1 * | 12/2015 | Watanabe | G09G 3/3648 345/88 |
| 2019/0285921 | A1 * | 9/2019 | Chen | G09G 3/3666 |
| 2020/0066215 | A1 * | 2/2020 | Koo | G09G 3/3426 |
| 2022/0093056 | A1 * | 3/2022 | Macias | G09G 5/395 |
| 2023/0081458 | A1 * | 3/2023 | Chen | G09G 3/3406 345/691 |
| 2024/0029665 | A1 * | 1/2024 | Wu | G09G 3/3406 |

* cited by examiner

*Primary Examiner* — Jose R Soto Lopez
(74) *Attorney, Agent, or Firm* — PV IP PC; Wei Te Chung

(57) ABSTRACT

A backlight driving method is provided. The method includes: determining a first duration of a first active pulse phase in a backlight driving signal corresponding to a target frame of a to-be displayed picture in a display panel, based on a target duty ratio and a first period corresponding to a target previous frame; wherein the target previous frame is a frame preceding the target frame, and the backlight driving signal is configured to drive a backlight of the display panel; and determining a second duration based on a maximum period corresponding to a frame at a lowest refresh frequency of the display panel and the first period, to delay a start time of the first active pulse phase based on the second duration.

20 Claims, 4 Drawing Sheets

BACKLIGHT DRIVING METHOD AND DISPLAY DEVICE

CROSS-REFERENCE TO RELATED APPLICATIONS

This application claims priority to Chinese Patent Application No. 202310129322.5, filed on Jan. 31, 2023, entitled "BACKLIGHT DRIVING METHOD AND DISPLAY DEVICE", which is incorporated herein by reference in its entirety.

TECHNICAL FIELD

The present application relates to the field of display technologies, and more particularly, to a backlight driving method and a display device.

BACKGROUND

Variable refresh rate technique is often used with existing display devices to prevent a screen tearing during an experience on a game. With the variable refresh rate technique, a frequency of a vertical synchronization signal of a display panel is dynamically changed within a certain range (e.g., 60 Hz~120 Hz). However, a backlight driving signal using the local dimming technology is not changed instantaneously while the refresh rate changes. A period duration of the vertical synchronization signal corresponding to a previous frame is obtained by the backlight driving signal when a rising edge of the vertical synchronization signal corresponding to a next frame arrives. As such, a duty ratio of the backlight driving signal corresponding to the previous frame is calculated and used in a phase corresponding to the next frame. Thus, the backlight driving signal fails to change with the refresh rate, and a flickering is present in the screen.

SUMMARY

An embodiment of the present disclosure provides a backlight driving method including: determining a first duration of a first active pulse phase in a backlight driving signal corresponding to a target frame of a to-be displayed picture in a display panel, based on a target duty ratio and a first period corresponding to a target previous frame; wherein the target previous frame is a frame preceding the target frame, and the backlight driving signal is configured to drive a backlight of the display panel; and determining a second duration based on a maximum period corresponding to a frame at a lowest refresh frequency of the display panel and the first period, to delay a start time of the first active pulse phase based on the second duration.

In an embodiment, the determining the second duration based on the maximum period corresponding to the frame at the lowest refresh frequency of the display panel and the first period, to delay the start time of the first active pulse phase based on the second duration includes determining the second duration based on a difference between the maximum period and the first period, to delay the start time of the first active pulse phase based on the second duration.

In an embodiment, the determining the first duration of the first active pulse phase in the backlight driving signal corresponding to the target frame of the to-be displayed picture in the display panel, based on the target duty ratio and the first period corresponding to the target previous frame includes determining the first duration based on a product of the target duty ratio and the first period.

In an embodiment, before determining the first duration of the first active pulse phase in the backlight driving signal corresponding to the target frame of the to-be displayed picture in the display panel, based on the target duty ratio and the first period corresponding to the target previous frame, the method includes determining the first period corresponding to the target previous frame in a vertical synchronization signal based on a second active pulse phase corresponding to the target frame in the vertical synchronization signal.

In an embodiment, a time difference between the start time of the first active pulse phase and an end time of the second active pulse phase is equal to the second duration.

In an embodiment, after determining the second duration based on the maximum period corresponding to the frame at the lowest refresh frequency of the display panel and the first period, to delay the start time of the first active pulse phase based on the second duration, the method includes: determining a third duration in the backlight driving signal corresponding to the target frame and corresponding to a first inactive phase before the first active pulse phase, based on a refresh frequency of the display panel; and determining a fourth duration in the backlight driving signal corresponding to the target frame and corresponding to a second inactive phase after the first active pulse phase, based on the third duration, the first duration, and the target duty ratio.

In an embodiment, the determining the third duration in the backlight driving signal corresponding to the target frame and corresponding to the first inactive phase before the first active pulse phase, based on the refresh frequency of the display panel includes determining the third duration based on a difference between the maximum period and a minimum period corresponding to a frame at a highest refresh frequency of the display panel.

In an embodiment, the determining the fourth duration in the backlight driving signal corresponding to the target frame and corresponding to the second inactive phase after the first active pulse phase, based on the third duration, the first duration, and the target duty ratio includes determining the fourth duration based on a difference between a ratio of the first duration and the target duty ratio and a sum of the third duration and the first duration.

In an embodiment, after determining the second duration based on the maximum period corresponding to the frame at the lowest refresh frequency of the display panel and the first period, to delay the start time of the first active pulse phase based on the second duration, the method includes determining a duration in the backlight driving signal corresponding to the target frame and corresponding to an inactive phase after the first active pulse phase based on a difference between a ratio of the first duration and the target duty ratio and the first duration.

A display device is provided, and includes a display panel; a plurality of backlight sources configured to provide the backlight to the display panel; and a control module configured to execute instructions for driving a plurality of the backlight sources. The control module includes: at least one processor; and a memory storing the instructions, wherein the instructions when executed by the at least one processor, cause the at least one processor to perform operations. The operations include the backlight driving method provided in embodiments of the present disclosure.

BRIEF DESCRIPTION OF THE DRAWINGS

In order that the technical solution in the embodiments of the present disclosure may be explained more clearly, references will now be made briefly to the accompanying drawings required for the description of the embodiments. It will be apparent that the accompanying drawings in the following description are merely some of the embodiments of the present disclosure, and other drawings may be made to those skilled in the art without involving any inventive effort.

DETAILED DESCRIPTION OF THE EMBODIMENTS

Figure 1A:
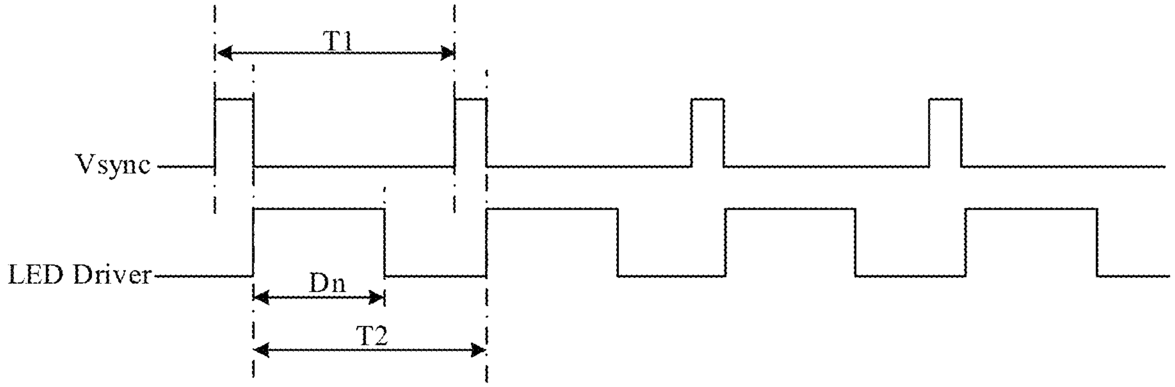
FIGS. 1A to 1B are timing diagrams of a backlight driving signal and a vertical synchronization signal in the existing technology.

The technical solutions in the embodiments of the present disclosure will be clearly and completely described in connection with the accompanying drawings in the embodiments of the present disclosure. It will be apparent that the described embodiments are merely a part of the embodiments of the present disclosure, rather than all the embodiments. Based on the embodiments in the present disclosure, all other embodiments obtained by a person skilled in the art without any inventive effort are within the scope of the present disclosure.

In the description of this disclosure, it should be understood that the azimuth or positional relationship indicated by the terms "center", "length", "width", "up", "down", "front", "back", "left", "right", "inside", "outside", and the like, is based on the azimuth or positional relationship shown in the drawings, merely to facilitate and simplify the description of this disclosure, and not to indicate or imply that the indicated device or element must have a particular azimuth, be constructed and operated in a particular azimuth, and therefore is not to be construed as limiting the disclosure. Furthermore, the terms "first" and "second" are used for descriptive purposes only and are not to be construed as indicating or implying relative importance or implying the number of indicated technical features. Thus, features defined as "first", "second" may expressly or implicitly include one or more of said features. In the description of this application, "plurality" means two or more, unless otherwise expressly and specifically defined.

In the description of the present disclosure, unless expressly defined and defined otherwise, terms such as "connected with", "connected to", "mounted", "fixed" and the like are to be understood in a broad sense, for example, may be fixedly connected, detachably connected, or as a whole; may be mechanically connected or electrically connected; may be directly connected, indirectly connected through an intermediate medium, connected inside the two elements or interacted between the two elements. It will be appreciated by those of ordinary skill in the art that the foregoing may be understood as a specific meaning within the present application, depending on the specific circumstances.

Figure 1B:
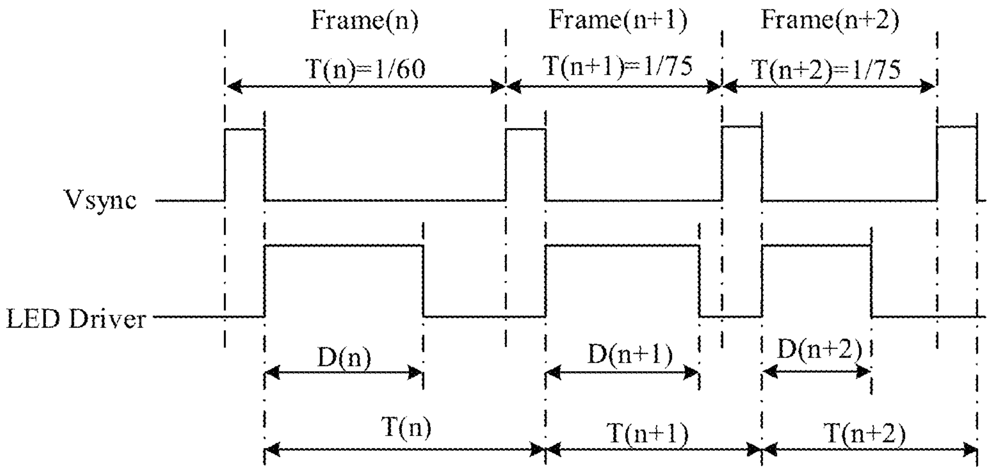

FIGS. 1A to 1B are timing diagrams of a backlight driving signal and a vertical synchronization signal in the existing technology. The local dimming is based on partitionally controlling the backlight, to match the brightness of the backlight with the brightness of the gray scale of the image. By controlling the brightness of the backlight in partition, the dynamic contrast of the picture is improved, and also the energy efficiency is satisfied. The effect of matching the brightness of the backlight with the brightness of the gray scale of the image depends on the synchronization of the backlight driving signal LED Driver with the vertical synchronization signal Vsync. As shown in FIG. 1A, the period T1 of the vertical synchronization signal Vsync is provided to be equal to the period T2 of the backlight driving signal LED Driver. The brightness of the backlight is controlled by varying the duty ratio. In a case that the gray scale for displaying pictures ranges from 0 to 255 and the gray scale corresponding to the currently displayed picture is 128, the duty ratio of the backlight driving signal LED Driver corresponding to the period Tn of the frame of the currently displayed picture is 128/255=50%. Accordingly, the backlight driving chip is controlled to maintain the high-level duration in the frame corresponding to the currently displayed picture of the backlight driving signal LED Driver, with Dn=50%*Tn.

In a case that the refresh frequency of the display panel and the gray scale of the displayed pictures are unchanged, the high-level duration Dn corresponding to the period of the frame of the currently displayed picture remains unchanged, the duty ratio corresponding to the period Tn of the frame of the currently displayed picture remains unchanged by 50%, and no flickering is appeared in the backlight brightness.

However, when the refresh frequency of the display panel changes, the period corresponding to the vertical synchronization signal Vsync changes. The magnitude of the period change of the vertical synchronization signal Vsync corresponding to the refresh frequency change is obtained by the backlight driving signal LED Driver when a rising edge of the vertical synchronization signal Vsync corresponding to a next frame arrives. The high-level duration of the corresponding backlight driving signal LED Driver is then obtained. Specifically, as shown in FIG. 1B, in a case that the refresh frequency of the display panel is changed from 60 Hz of Frame (n) to 75 Hz of Frame (n+1), the period of the vertical synchronization signal Vsync is changed from T (n)=$\frac{1}{60}$ to T (n+1)=$\frac{1}{75}$ correspondingly. The high-level duration of the period corresponding to Frame (n) in the backlight driving signal LED Driver is D (n), and correspondingly, the duty ratio is Duty (n)=D (n)/T (n)=D (n)*60. Since the high-level duration D (n+1) of the backlight driving signal LED Driver corresponding to the period of Frame (n+1) is not instantly changed, instead changing at rising edge of the Frame (n+2) of the vertical synchronization signal Vsync, the high-level duration D (n+1) of the backlight driving signal LED Driver corresponding to the period of the Frame (n+1) remains the same as D (n). Accordingly, the duty ratio is Duty (n+1)=D (n+1)/T (n+1)=D (n)/T (n+1)=D (n)*75. Therefore, Duty (n+1) corresponding to Frame (n+1) is greater than Duty (n) corresponding to Frame (n), the backlight becomes brighter than normal. At Frame (n+2), the refresh frequency of the display panel maintains 75 Hz, and the period of the vertical synchronization signal Vsync is T (n+2)=$\frac{1}{75}$. Since the backlight driving signal LED Driver changes in response to a change in the refresh frequency when the rising edge of the Frame (n+2) of the vertical synchronization signal Vsync arrives, the backlight driving signal LED Driver has a high-level duration D (n+2)=D (n)/T (n)*T (n+2)=D (n)*$\frac{60}{75}$ of the period corresponding to Frame (n+2). Accordingly, the duty ratio is Duty (n+2)=D (n+2)/T (n+2)=D (n)*60. Therefore, Duty (n+2) corresponding to Frame (n+2) is less than Duty (n+1) corresponding to Frame (n+1), the backlight returns to normal. However, the change on the brightness of the backlight is easily perceived by the human eye, so that a flickering problem occurs.

Figure 2:
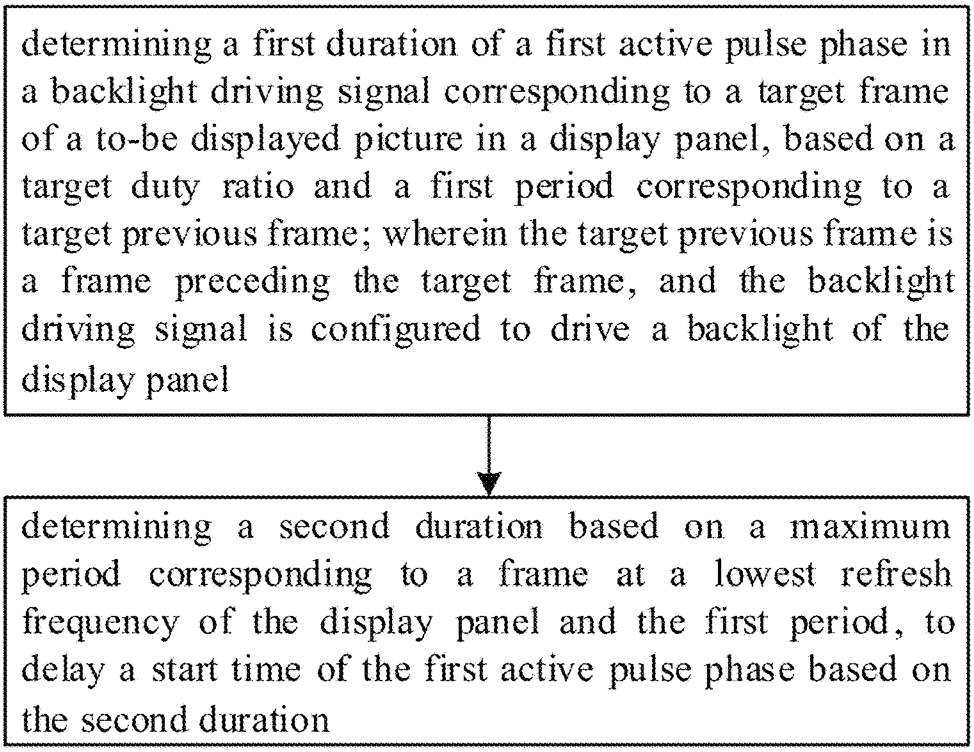
FIG. 2 is a flowchart of a backlight driving method according to an embodiment of the present disclosure.

FIG. 2 is a flowchart of a backlight driving method according to an embodiment of the present disclosure. The present disclosure provides a backlight driving method including the following steps. The steps are merely for illustration, and should not be interpreted as a limit on sequence.

Step 10: determining a first duration of a first active pulse phase of a backlight driving signal LED Driver corresponding to a target frame of a to-be displayed picture in a display panel, based on a target duty ratio Duty_tar and a first period corresponding to a target previous frame. The target previous frame is a frame preceding the target frame, and the backlight driving signal LED Driver is configured to drive a backlight of the display panel.

Step 20: determining a second duration based on a maximum period Tmax corresponding to a frame at a lowest refresh frequency of the display panel and the first period, to delay a start time of the first active pulse phase based on the second duration.

Alternatively, the target duty ratio Duty_tar corresponding to the target frame in the backlight driving signal LED Driver may be determined based on the gray scale corresponding to the target frame. Alternatively, the target duty ratio Duty_tar matching the gray scale of the target frame may be calculated by an existing calculation method.

Alternatively, the target frame may refer to one frame or may refer to multiple frames with a same gray scale. The refresh frequency corresponding to the target previous frame is different from the refresh frequency corresponding to the target frame.

In an embodiment, the maximum period Tmax is a period in the vertical synchronization signal Vsync corresponding to the frame displayed at the lowest refresh frequency of the display panel. Alternatively, the first period is a period corresponding to the target previous frame in the vertical synchronization signal Vsync, as such, the vertical synchronization signal Vsync and the backlight driving signal LED Driver are defined synchronically.

In an embodiment, the first period corresponding to the target previous frame in the vertical synchronization signal Vsync may be determined based on a second active pulse phase corresponding to the target frame in the vertical synchronization signal Vsync. Accordingly, before the step of determining the first duration of the first active pulse phase of the backlight driving signal LED Driver corresponding to the target frame of the to-be displayed picture in the display panel, based on the target duty ratio Duty_tar and the first period corresponding to the target previous frame, the method includes determining the first period corresponding to the target previous frame in the vertical synchronization signal Vsync based on the start time of the second active pulse phase corresponding to the target frame in the vertical synchronization signal Vsync. That is, the time difference between the start time of the first active pulse phase and the start time of the second active pulse phase is the first period.

Alternatively, the time difference between the end time of the first active pulse phase and the end time of the second active pulse phase is the first period.

In an embodiment, the time difference between the start time of the first active pulse phase and the end time of the second active pulse phase is equal to the second duration. The backlight driving signal LED Driver is different from the existing one (the start time of the first active pulse phase corresponding to the target frame is the same as the end time of the second active pulse phase corresponding to the target frame in the vertical synchronization signal), and the start time of the first active pulse phase is not earlier than the end time of the second active pulse phase. As such, the duty ratio of the second period corresponding to the target frame in the backlight driving signal LED Driver is adjusted while the vertical synchronization signal Vsync and the backlight driving signal LED Driver are synchronically defined, thereby improving the flickering problem during the changes in the refresh frequency.

Alternatively, a plurality of the backlight sources may be driven by a control module according to the backlight driving method.

Alternatively, the target duty ratio Duty_tar, the first duration, the second duration, and the first period may be determined by a controller in a control module, and a control signal is output to a backlight driving chip by the controller. The backlight driving signal LED Driver is generated by the backlight driving chip based on the control signal, and the duty ratio of the second period corresponding to the target frame in the backlight driving signal LED Driver to is the target duty ratio Duty_tar, thereby improving the flickering problem during the changes in the refresh frequency.

Figure 3A:
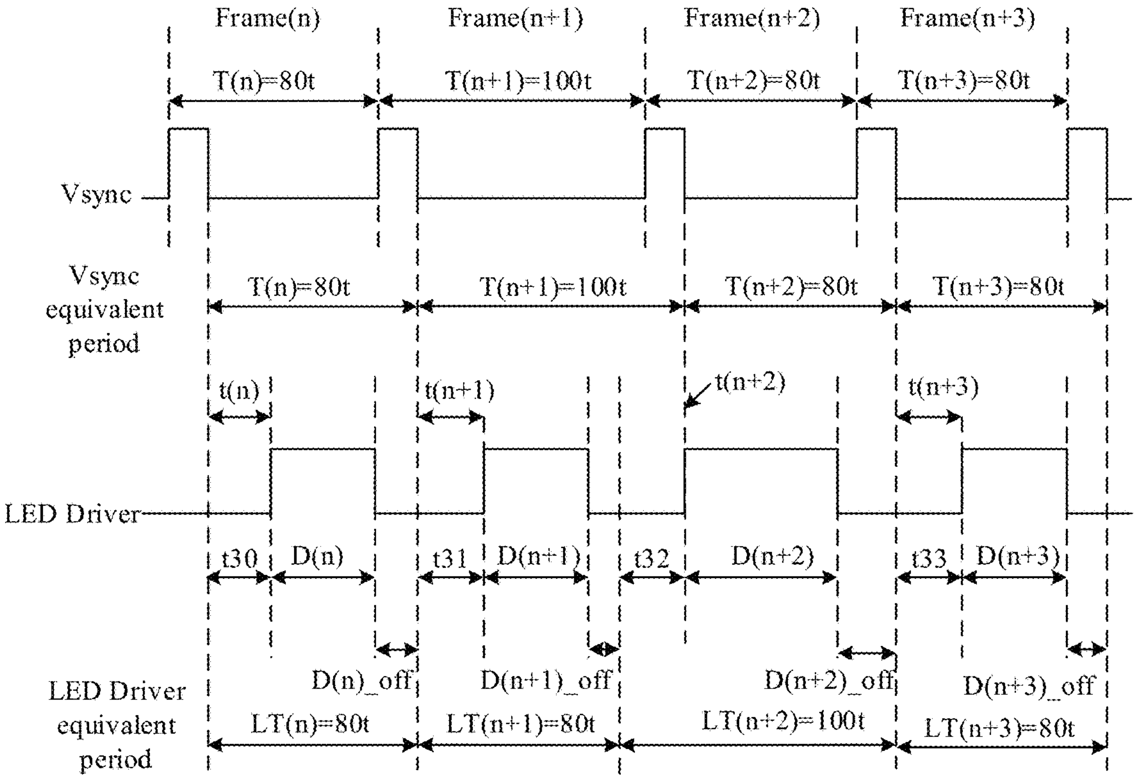
FIGS. 3A to 3B are timing diagrams of a backlight driving signal and a vertical synchronization signal according to an embodiment of the present disclosure.
Figure 3B:
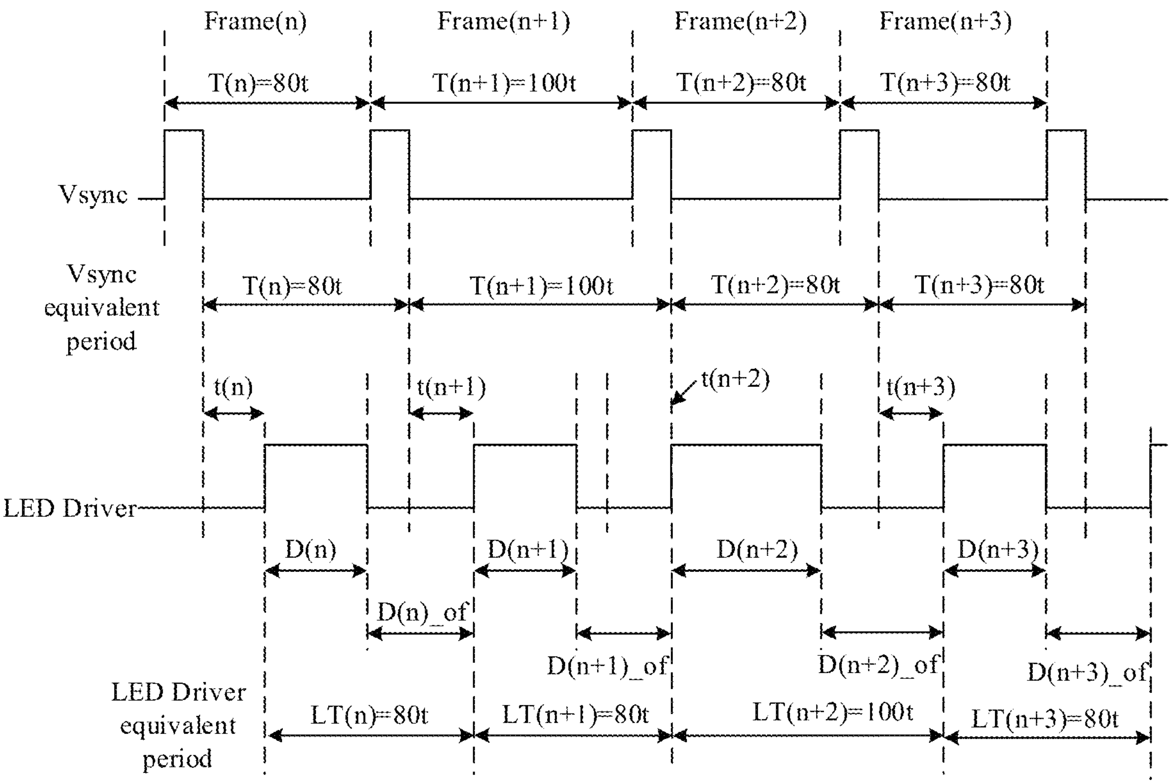

FIGS. 3A to 3B are timing diagrams of a backlight driving signal and a vertical synchronization signal according to an embodiment of the present disclosure. An example is taken that, the gray scale corresponding to the target frame of the to-be displayed picture in the display panel needs to match the backlight having the duty ratio of 50% while the refresh frequency of the display panel changes.

Alternatively, the target frame may include an (n) th frame of Frame (n), an (n+1) th frame of Frame (n+1), an (n+2) th frame of Frame (n+2), and an (n+3) th frame of Frame (n+3). The n-th frame of Frame (n) is the target previous frame of the (n+1) th frame of Frame (n+1), the (n+1) th frame of Frame (n+1) is the target previous frame of the (n+2) th frame of Frame (n+2), and the (n+2) th frame of Frame (n+2) is the target previous frame of the (n+3) th frame of Frame (n+3).

The (n) th frame of Frame (n), the (n+1) th frame of Frame (n+1), the (n+2) th frame of Frame (n+2), and the (n+3) th frame of Frame (n+3) all need to match the backlight having the duty ratio of 50%. Accordingly, the target duty ratio Duty_tar of the second period corresponding to the target frame in the backlight driving signal LED Driver is 50%.

In a case that the target frame is the (n+1) th frame of Frame (n+1), the second period is the period LT (n+1) in the backlight driving signal LED Driver corresponding to the (n+1) th frame of Frame (n+1). The first period is the period T (n) in the vertical synchronization signal Vsync corresponding to the (n) th frame of Frame (n). The second duration is the duration t (n+1) from the start time of the first active pulse phase in the period LT (n+1) in the backlight driving signal LED Driver corresponding to the (n+1) th frame of Frame (n+1) to the falling edge of the second active pulse phase in the vertical synchronization signal Vsync corresponding to the (n+1) th frame of Frame (n+1). The first duration is the duration D (n+1) corresponding to the first active pulse phase in the period LT (n+1) in the backlight driving signal LED Drive corresponding to the (n+1) th frame of Frame (n+1).

In a case that the target frame is the (n+2) th frame of Frame (n+2), the second period is the period LT (n+2) in the backlight driving signal LED Driver corresponding to the (n+2) th frame of Frame (n+2). The first period is the period T (n+1) in the vertical synchronization signal Vsync corresponding to the (n+1) th frame of Frame (n+1). The second duration is the duration t (n+2) from the start time of the first active pulse phase in the period LT (n+2) in the backlight driving signal LED Driver corresponding to the (n+2) th frame of Frame (n+2) to the falling edge of the second active pulse phase in the vertical synchronization signal Vsync corresponding to the (n+2) th frame of Frame (n+2). The first duration is the duration D (n+2) corresponding to the first active pulse phase in the period LT (n+2) in the backlight driving signal LED Driver corresponding to the (n+2) th frame of Frame (n+2).

In a case that the target frame is the (n+3) th frame of Frame (n+3), the second period is the period LT (n+3) in the backlight driving signal LED Driver corresponding to the (n+3) th frame of Frame (n+3). The first period is the period T (n+3) in the vertical synchronization signal Vsync corresponding to the (Frame+3) th frame of Frame (n+3). The second duration is the duration t (n+3) from the start time of the first active pulse phase in the period LT (n+3) in the backlight driving signal LED Driver corresponding to the (n+3) th frame of Frame (n+3) to the falling edge of the second active pulse phase in the vertical synchronization signal Vsync corresponding to the (n+3) th frame of Frame (n+3). The first duration is the duration D (n+3) corresponding to the first active pulse phase in the period LT (n+3) in the backlight driving signal LED Driver corresponding to the (n+3) th frame of Frame (n+3).

In a case that the target frame is the (n) th frame of Frame (n), the second period is the period LT (n) in the backlight driving signal LED Driver corresponding to the (n) th frame of Frame (n). The second duration is the duration t (n) from the start time of the first active pulse phase in the period LT (n) in the backlight driving signal LED Driver corresponding to the (n) th frame of Frame (n) to the falling edge of the second active pulse phase in the vertical synchronization signal Vsync corresponding to the (n) th frame of Frame (n). The first duration is the duration D (n) corresponding to the first active pulse phase in the period LT (n) in the backlight driving signal LED Drive corresponding to the (n) th frame of Frame (n).

In an embodiment, the step of determining the first duration of the first active pulse phase of the backlight driving signal LED Driver corresponding to the target frame of a to-be displayed picture in the display panel, based on the target duty ratio Duty_tar and the first period corresponding to the target previous frame, includes determining the first duration based on a product of the target duty ratio Duty_tar and the first period.

In an embodiment, the step of determining the second duration based on the maximum period Tmax corresponding to the frame at the lowest refresh frequency of the display panel at and the first period, to delay the start time of the first active pulse phase based on the second duration, includes determining the second duration based on a difference between the maximum period Tmax and the first period, to delay the start time of the first active pulse phase based on the second duration.

Specifically, the period is represented by n*t for an easy calculation on the duty ratio. Referring to FIG. 3A to 3B, an example is provided that the maximum period Tmax in the vertical synchronization signal Vsync corresponding to the frame at the lowest refresh frequency of the display panel at is 100t, and T (n)=80t, T (n+1)=100t, T (n+2)=80t, and T (n+2)=80t.

In a case that the target frame is the (n+1) th frame of Frame (n+1), the second duration t (n+1)=Tmax−T (n)=100t−80t=20t, and the first duration D (n+1)= Duty_tar*T (n)=50%*80t=40t.

In a case that the target frame is the (n+2) th frame of Frame (n+2), the second duration t (n+2)=Tmax−T (n+1)= 100t−100t=0t, and the first duration D (n+2)=Duty_tar*T (n+1)=50%*100t=50t.

In a case that the target frame is the (n+3) th frame of Frame (n+3), the second duration t (n+3)=Tmax−T (n+3+ 2)=100t−80t=20t, and the first duration D (n+3)= Duty_tar*T (n)=50%*80t=40t.

In an embodiment, the control module determines the target duty ratio Duty_tar corresponding to the target frame, the second duration, the first duration, and the duration corresponding to the inactive phase in the second period, in the high level active phase corresponding to the target frame of the vertical synchronization signal Vsync. For example, in the second active pulse phase in the vertical synchronization signal Vsync corresponds to the (n+1) th frame of Frame (n+1), the target duty ratio Duty_tar corresponding to the (n+1) th frame of Frame (n+1), the second duration, the first duration, and the duration corresponding to the inactive phase in the second period are determined.

Alternatively, to maintain the alignment of the backlight driving signal LED Driver with the vertical synchronization signal Vsync, an inactive phase of the second period of the target frame corresponding to the backlight driving signal LED Driver may be partially preceded by the first active pulse phase.

Alternatively, in a case that an inactive phase of the second period of the target frame corresponding to the backlight driving signal LED Driver is preceded by the first active pulse phase, the duration corresponding to the inactive phase may be determined based on the refresh frequency of the display panel, the first duration, and the target duty ratio Duty_tar. Correspondingly, after the step of determining the second duration based on the maximum period Tmax corresponding to the frame at the lowest refresh frequency of the display panel at and the first period, to delay the start time of the first active pulse phase based on the second duration, the method further includes: determining a third duration in the backlight driving signal LED Driver corresponding to the target frame and corresponding to the first inactive phase preceded by the first active pulse phase, based on the refresh frequency of the display panel; and determining a fourth duration in the backlight driving signal LED Driver corresponding to the target frame and corresponding to a second inactive phase after the first active pulse phase, based on the third duration, the first duration, and the target duty ratio Duty_tar.

Alternatively, the third duration may be determined based on a maximum value of the second duration, to achieve alignment of the backlight driving signal LED Driver with the vertical synchronization signal Vsync.

Alternatively, the third duration is less than or equal to the maximum value of the second duration, to maintain alignment of the backlight driving signal LED Driver with the vertical synchronization signal Vsync.

Alternatively, the maximum value of the second duration may be determined based on the difference between the maximum period Tmax and the minimum period Tmin corresponding to a frame at a highest refresh frequency of the display panel the frame in the vertical synchronization signal Vsync.

In an embodiment, the step of determining the third duration in the backlight driving signal LED Driver corresponding to the target frame and corresponding to the first inactive phase preceding the first active pulse phase, based on the refresh frequency of the display panel includes determining the third duration according to a difference between a maximum period Tmax and a minimum period Tmin corresponding to a frame at a highest refresh frequency of the display panel in the vertical synchronization signal Vsync.

Specifically, with reference to FIG. 3A, in a case that the maximum period Tmax in the vertical synchronization signal Vsync corresponding to the frame at the lowest refresh frequency of the display panel is 100t, and the minimum period Tmin in the vertical synchronization signal Vsync corresponding to the frame at the highest refresh frequency of the display panel is 80t, the difference between the maximum period Tmax and the minimum period Tmin of the vertical synchronization signal Vsync is: Tmax−Tmin=100t−80t=20t.

In a case that the target frame is the (n+1) th frame of Frame (n+1), the third duration is the duration t31 of the difference between the maximum period Tmax and the minimum period Tmin in the period LT (n+1) before the start time of the first active pulse phase.

In a case that the target frame is the (n+2) th frame of Frame (n+2), the third duration is the duration t32 of the difference between the maximum period Tmax and the minimum period Tmin in the period LT (Frame+2) before the start time of the first active pulse phase.

In a case that the target frame is the (n+3) th frame of Frame (n+3), the third duration is the duration t33 of the difference between the maximum period Tmax and the minimum period Tmin in the period LT (n+3) before the start time of the first active pulse phase.

In a case that the target frame is the (n) th frame of Frame (n), the third duration is the duration t30 of the difference between the maximum period Tmax and the minimum period Tmin in the period LT (n) before the start time of the first active pulse phase.

That is, the period LT (n), the period LT (n+1), the period LT (n+2), or the period LT (n+3) each includes an inactive phase with the third duration before the first active pulse phase.

In a case that the (n) th frame of Frame (n) is the first frame of a plurality of frames having the same target duty ratio, the difference (i.e., t (n)) between the start time of the active pulse phase in the backlight driving signal LED Driver corresponding to the (n) th frame of Frame (n) and the end time of the active pulse phase in the vertical synchronization signal Vsync corresponding to the (n) th frame of Frame (n) may be equal to the third duration t30, to achieve alignment of the backlight driving signal LED Driver with the vertical synchronization signal Vsync. The third duration t30 may also be less than t (n), and accordingly, the third duration t30 is less than the difference between the maximum period Tmax and the minimum period Tmin.

In a case that the start time of the second period changes, the end time of the second period changes synchronously accordingly. As such, the duty ratio of the second period is the target duty ratio. Therefore, when the third duration t30 corresponding to the (n) th frame of Frame (n) in the backlight driving signal LED Driver changes, the third duration t31 corresponding to the (n+1) th frame of Frame (n+1) in the backlight driving signal LED Driver, the third duration t32 corresponding to the (n+2) th frame of Frame (n+2) in the backlight driving signal LED Driver, and the third duration t33 corresponding to the (n+3) th frame of Frame (n+3) in the backlight driving signal LED Driver also change correspondingly. Therefore, the third duration t31 corresponding to the (n+1) th frame of Frame (n+1) in the backlight driving signal LED Driver, the third duration t32 corresponding to the (n+2) th frame of Frame (n+2) in the backlight driving signal LED Driver, and the third duration t33 corresponding to the (n+3) th frame of Frame (n+3) in the backlight driving signal LED Driver may be respectively less than the difference between the maximum period Tmax and the minimum period Tmin (i.e., less than the maximum value of the second duration).

Alternatively, with the production of the display device including the display panel, the maximum refresh frequency and the minimum refresh frequency of the display panel are determined, and accordingly, the difference between the maximum period Tmax and the minimum period Tmin of the vertical synchronization signal Vsync are also determined. The difference between the maximum period Tmax and the minimum period Tmin of the vertical synchronization signal Vsync may be stored in the memory for calling of the backlight driving method.

In a case that the first duration, the third duration, and the target duty ratio Duty_tar are all known, the fourth duration can be calculated by using the first duration, the third duration, and the target duty ratio Duty_tar. Accordingly, the step of determining the fourth duration in the backlight driving signal LED Driver corresponding to the target frame and corresponding to the second inactive phase after the first active pulse phase, based on the third duration, the first duration, and the target duty ratio Duty_tar, includes determining the fourth duration based on a difference between a ratio of the first duration and the target duty ratio Duty_tar and a sum of the third duration and the first duration, to obtain the second period in which the duty ratio is the target duty ratio Duty_tar.

Specifically, with reference to FIG. 3A, in a case that the target frame is the (n+1) th frame of Frame (n+1), the fourth duration is the duration D (n+1)_off in the period LT (n+1) with the length of D(n+1)/Duty_tar−(t31+D(n+1)) and after the start time of the first active pulse phase. That is, D (n+1)_off=D(n+1)/Duty_tar−(t31+D(n+1))=40t/50%−(20t+40t)=20t.

In a case that the target frame is the (n+2) th frame of Frame (n+2), the fourth duration is the duration D (n+2)_off in the period LT (n+2) with the length of D(n+2)/Duty_tar−(t32+D(n+2)) and after the start time of the first active pulse phase. That is, D(n+2_off=D(n+2)/Duty_tar−(t32+D(n+2))=50t/50%−(20t+50t)=30t.

In a case that the target frame is the (n+3) th frame of Frame (n+3), the fourth duration is the duration D (n+3)_off in the period LT (n+3) with the length of D(n+3)/Duty_tar−(t33+D(n+3)) and after the start time of the first active pulse phase. That is, D(n+3)_off=D(n+3)/Duty_tar−(t33+D(n+3))=40t/50%−(20t+40t)=20t.

In a case that the target frame is the (n) th frame of Frame (n), the fourth duration is the duration D (n)_off in the period LT (n) after the start time of the first active pulse phase.

Accordingly, based on the first duration, the second duration, and the fourth duration, the duty ratio of the second period in the backlight driving signal LED Driver corresponding to the target frame is equal to the target duty ratio Duty_tar, so that the flicking problem caused by a failed match of the change in the backlight driving signal with the change in the refresh frequency can be improved.

Specifically, referring to FIG. 3A, in a case that the target frame is the (n+1) th frame of Frame (n+1), the second period LT (n+1) is the sum of the first duration D (n+1), the third duration t31, and the fourth duration D (n+1)_off, that is, LT(n+1)=D(n+1)+t31+D(n+1) off=40t+20t+20t=80t. Accordingly, the duty ratio D Duty(n+1)=D(n+1)/LT(n+1)*100%=40t/80t*100%=50%, such that the duty ratio Duty (n+1) of the second period LT (n+1) is equal to the target duty ratio Duty_tar.

In a case that the target frame is the (n+2) th frame of Frame (n+2), the second period LT (n+2) is the sum of the first duration D (n+2), the third duration t32, and the fourth duration D (n+2)_off, that is, LT (n+2)=D (n+2)+t32+D (n+2)_off=50t+20t+30t=100t. Accordingly, the duty ratio Duty (n+2)=D (n+2)/LT (n+2)*100%=50t/100t*100%=50%, such that the duty ratio Duty (n+2) of the second period LT (n+2) is equal to the target duty ratio Duty_tar.

In a case that the target frame is the (n+3) th frame of Frame (n+3), the second period LT (n+3) is the sum of the first duration D (n+3), the third duration t33, and the fourth duration D (n+3)_off, that is, LT (n+3)=D (n+3)+t33+D (n+3)_off=40t+20t+20t=80t. Accordingly, the duty ratio Duty (n+3)=D (n+3)/LT (n+3)*100%–40t/80t*100%=50%, such that the duty ratio Duty (n+3) of the second period LT (n+3) is equal to the target duty ratio Duty_tar.

In a case that the target frame is the (n) th frame of Frame (n), the second period LT (n) is the sum of the first duration D (n), the second duration t30, and the fourth duration D (n)_off.

Alternatively, the inactive phase of the second period of the backlight driving signal LED Driver corresponding to the target frame may also be after the first active pulse phase (i.e., in the case that the third duration is equal to 0).

Alternatively, in a case that the inactive phase of the second period in the backlight driving signal LED Driver corresponding to the target frame is after the active pulse phase, the duration corresponding to the inactive phase after the active pulse phase in the second period is determined based on the first duration and the target duty ratio Duty_tar. Accordingly, after the step of determining the second duration based on the maximum period Tmax corresponding to the frame at the lowest refresh frequency of the display panel at and the first period, to delay the start time of the first active pulse phase based on the second duration, the method includes: determining the duration corresponding to the inactive phase in the backlight driving signal LED Driver after the first active pulse phase and corresponding to the target frame, based on the difference between the ratio of the first duration and the target duty ratio Duty_tar and the first duration. The duty ratio of the second period corresponding to the target frame in the backlight driving signal LED Driver is the target duty ratio Duty_tar. When the backlight driving signal LED Driver drives the backlight source at the second period to provide a light source for the display panel displaying the target frame, the flicking problem caused by a failed match of the change in the backlight driving signal with the change in the refresh frequency can be improved.

Specifically, with reference to FIG. 3B, in a case that the target frame is the (n+1) th frame of Frame (n+1), the duration of the inactive phase is the duration D (n+1)_of in the period LT (n+1) with the length of D(n+1)/Duty_tar–D (n+1) and after the start time of the first active pulse phase. That is, D(n+1)_of=D(n+1)/Duty_tar–D(n+1)=40t/50%–40t=40t.

In a case that the target frame is the (n+2) th frame of Frame (n+2), the duration of the inactive phase is the duration D (n+2)_of in the period LT (n+2) with the length of D(n+2)/Duty_tar–D(n+2) and after the start time of the first active pulse phase. That is, D(n+2)_of=D(n+1)/Duty_tar–D(n+2)=50t/50%–50t=50t.

In a case that the target frame is the (n+3) th frame of Frame (n+3), the duration of the inactive phase is the duration D (n+3) of in the period LT (n+3) with the length of D(n+3)/Duty_tar–D(n+3) and after the start time of the first active pulse phase. That is, D(n+3)_of=D(n+3)/Duty_tar–D(n+3)=40t/50%–40t=40t.

In a case that the target frame is the (n) th frame of Frame (n), the duration of the inactive phase is the duration D (n)_of in the period LT (n) after the start time of the first valid pulse phase.

Accordingly, based on the first duration and the duration of the inactive phase, the second period satisfying the duty ratio Duty_tar as the target duty ratio is obtained, so as to improve the flicking problem caused by the fact that the change in the backlight driving signal does not match the change in the refresh frequency.

Specifically, with reference to FIG. 3B, in a case that the target frame is the (n+1) th frame of Frame (n+1), the second period LT (n+1) is the sum of the first duration D (n+1) and the duration D (n+1)_of, that is, LT(n+1)=D(n+1)+D(n+1)_of=40t+40t=80t. Accordingly, the duty ratio Duty (n+1)=D (n+1)/LT (n+1)*100%–40t/80t*100%=50% is such that the duty ratio Duty (n+1) of the second period LT (n+1) corresponding to the target frame in the backlight driving signal LED Driver is equal to the target duty ratio Duty_tar.

In a case that the target frame is the (n+2) th frame of Frame (n+2), the second period LT (n+2) is the sum of the first duration D (n+2) and the duration D (n+2)_of, that is, LT(n+2)=D(n+2)+D(n+2)_of=50t+50t=100t. Accordingly, the duty ratio Duty(n+2)–D(n+2)/LT(n+2)*100%=50t/100t*100%=50% is such that the duty ratio Duty (n+2) of the second period LT (n+2) corresponding to the target frame in the backlight driving signal LED Driver is equal to the target duty ratio Duty_tar.

In a case that the target frame is the (n+3) th frame of Frame (n+3), the second period LT (n+3) is the sum of the first duration D (n+3) and the duration D (n+3)_of, that is, LT(n+3)=D(n+3)+D(n+3)_of=40t+40t=80t. Accordingly, the duty ratio Duty(n+3)–D(n+3)/LT(n+3)*100%=40t/80t*100%=50% is such that the duty ratio Duty (n+3) of the second period LT (n+3) corresponding to the target frame in the backlight driving signal LED Driver is equal to the target duty ratio Duty_tar.

In a case that the target frame is the (n) th frame of Frame (n), the second period LT (n) corresponding to the target frame in the backlight driving signal LED Driver is the sum of the first duration D (n) and the duration D (n)_of.

As shown in FIG. 3A and FIG. 3B, in the period LT (n+1), the period LT (n+2), and the period LT (n+3) of the change in the refresh frequency of the display panel, the average duty ratio Duty_ave is the target duty ratio Duty_tar. Duty_ave–(D(n+1)+D(n+2)+D(n+3))/(LT(n+1)+LT(n+2)+LT(n+3))*100%=(40t+50t+40t)/(80t+100t+80t)*100%=130t/260t*100%=50%.

Therefore, the backlight driving method can achieve re-division of the driving period of the backlight driving signal LED Driver by delaying the start time of the first active pulse phase based on the second duration, so that the corresponding duty ratios in the periods LT (n+1), LT (n+2), and LT (n+3) are kept equal to the target duty ratio Duty_tar, thereby improving the problem of flickering of the backlight during the change of the refresh frequency.

The backlight brightness matching the display screen may also be different when the gray scale of the display screen changes. When the gray scale of the display screen changes, the backlight driving method may be used to drive the backlight to improve the display effect.

Figure 4:
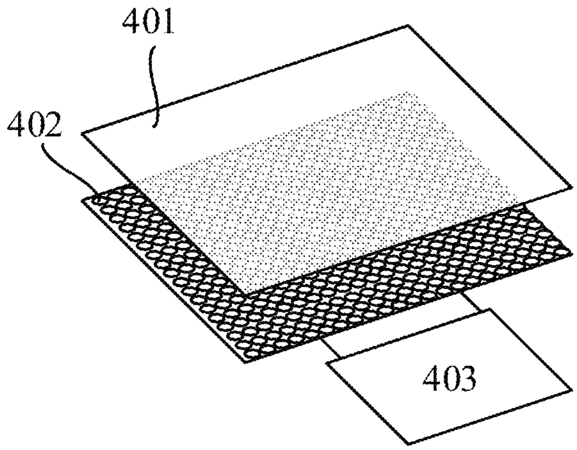
FIG. 4 is a schematic structural diagram of a display device according to an embodiment of the present disclosure.

FIG. 4 is a schematic structural diagram of a display device according to an embodiment of the present disclosure. The present disclosure also provides a display device including a display panel 401, a plurality of backlight sources 402, and a control module 403.

Alternatively, the display panel 401 includes a passive light-emitting display panel (such as a liquid crystal display panel) or the like.

The plurality of the backlight sources 402 are configured to provide backlight to the display panel. Alternatively, the backlight source 402 includes a light-emitting diode. Alternatively, the light-emitting diode includes a sub-millimeter light-emitting diode, a micro light-emitting diode, an organic light-emitting diode, and the like.

The control module 403 is configured to drive the plurality of the backlight sources 402 according to the backlight driving method, to provide backlight for the display panel 401.

Figure 5:
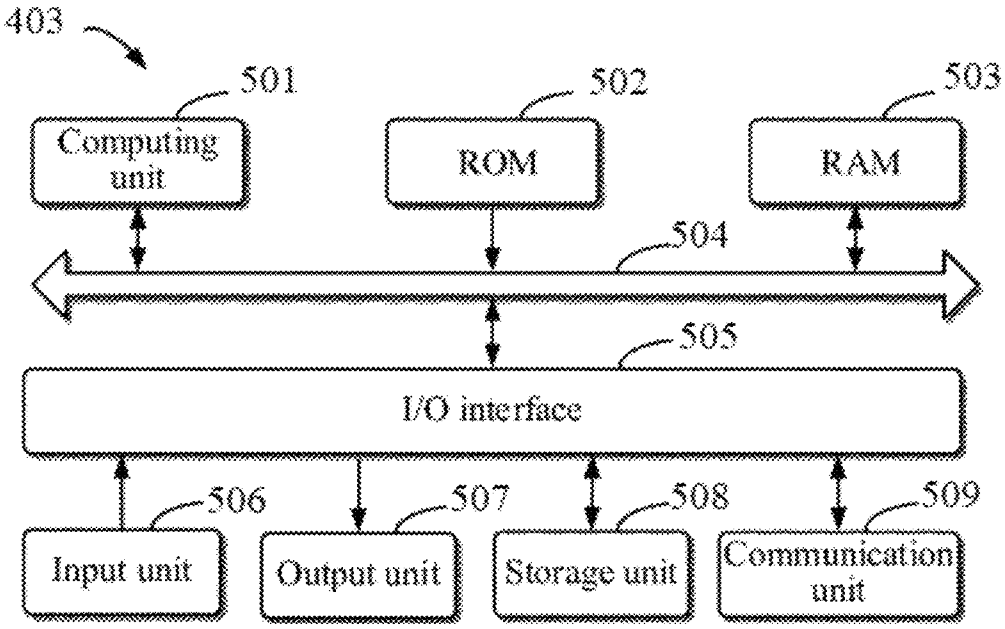
FIG. 5 is a schematic structural diagram of a control module adapted to execute a backlight driving method provided in embodiments of the present disclosure.

In an embodiment, FIG. 5 shows a schematic block diagram of an example control module 403 that may be configured to implement embodiments of the present disclosure. The control module 403 is configured to execute instructions for driving a plurality of the backlight sources 402. The control module 403 includes a computing unit 501, and a read-only memory (ROM) 502 or a computer program loaded into a random access memory (RAM) 503 from a storage unit 508. The RAM 503 may further store various instructions and data required by operations of the control module 403. The computing unit 501, the ROM 502, and the RAM 503 are connected to each other through a bus 504. An input/output (I/O) interface 505 is also connected to the bus 504. The instructions when executed by the computing unit 501, cause the computing unit 501 to perform operations. The operations include the above backlight driving method.

A plurality of components in the control module 403 is connected to the I/O interface 505, including: an input unit 506, such as a keyboard and a mouse; an output unit 507, such as various types of displays and speakers; a storage unit 508, such as a magnetic disk and an optical disk; and a communication unit 509, such as a network card, a modem, and a wireless communication transceiver. The communication unit 509 allows the control module 403 to exchange information/data with other devices through a computer network such as the Internet and/or various telecommunication networks.

The computing unit 501 may be various general purpose and/or special purpose processing components having a processing power and a computing power. Some examples of the computing unit 501 include, but are not limited to, a central processing unit (CPU), a graphics processing unit (GPU), various special purpose artificial intelligence (AI) computing chips, various computing units running a machine learning model algorithm, a digital signal processor (DSP), and any appropriate processor, controller, microcontroller, and the like. The computing unit 501 executes various methods and processes described above, such as the method for executing an instruction. For example, in some embodiments, the method for executing an instruction may be implemented as a computer software program that is tangibly included in a machine readable medium, such as the storage unit 508. In some embodiments, some or all of the computer programs may be loaded and/or installed onto the control module 403 via the ROM 502 and/or the communication unit 509. When the computer program is loaded into the RAM 503 and executed by the computing unit 501, one or more steps of the method for executing an instruction described above may be executed. Alternatively, in other embodiments, the computing unit 501 may be configured to execute the method for executing an instruction by any other appropriate approach (e.g., by means of firmware).

In an embodiment, the control module 403 may include a controller and a backlight driving chip. The controller is configured to determine the target duty ratio Duty_tar, the second duration, and the first duration, to generate a control signal.

Alternatively, the controller may include a master chip, a timing controller, a memory, and the like. Alternatively, the memory includes a non-volatile memory or the like.

The backlight driving chip is configured to generate the backlight driving signal LED Driver according to the control signal, so that the start time of the first active pulse phase corresponding to the target frame in the backlight driving signal LED Driver can be delayed based on the second duration. The problem of flicking on the backlight during the change in the refresh frequency is provided by using the plurality of the backlight sources 402 to provide backlight for the display panel 401.

It should be understood that the display device includes a movable display device (such as a notebook computer, a mobile phone, and the like), a fixed terminal (such as a desktop computer, a television, and the like), a measuring device (such as an activity band, a thermometer, and the like), and the like.

In the above-mentioned embodiments, the description of each embodiment has its own emphasis, and parts not described in detail in a certain embodiment may be referred to the related description of other embodiments.

The specific embodiments are used to illustrate the principles and embodiments of the present application. The description of the above embodiment is merely intended to help understand the technical solution and the core idea of the present application. It will be appreciated by those of ordinary skill in the art that modifications or equivalents may be made to the embodiments. These modifications or equivalents do not depart s from the scope of the embodiments of the present application.

What is claimed is:

1. A backlight driving method, comprising:

determining a first duration of a first active pulse phase in a backlight driving signal corresponding to a target frame of a to-be displayed picture in a display panel, based on a target duty ratio and a first period corresponding to a target previous frame; wherein the target previous frame is a frame preceding the target frame, and the backlight driving signal is configured to drive a backlight of the display panel; and determining a second duration based on a maximum period corresponding to a frame at a lowest refresh frequency of the display panel and the first period, to delay a start time of the first active pulse phase based on the second duration;

wherein determining the second duration based on the maximum period corresponding to the frame at the lowest refresh frequency of the display panel and the first period, to delay the start time of the first active pulse phase based on the second duration comprises:

determining the second duration based on a difference between the maximum period and the first period, to delay the start time of the first active pulse phase based on the second duration.

2. The backlight driving method of claim 1, wherein determining the first duration of the first active pulse phase in the backlight driving signal corresponding to the target frame of the to-be displayed picture in the display panel, based on the target duty ratio and the first period corresponding to the target previous frame comprises:

determining the first duration based on a product of the target duty ratio and the first period.

3. The backlight driving method of claim 1, wherein before determining the first duration of the first active pulse phase in the backlight driving signal corresponding to the target frame of the to-be displayed picture in the display panel, based on the target duty ratio and the first period corresponding to the target previous frame, the method comprises:

determining the first period corresponding to the target previous frame in a vertical synchronization signal based on a second active pulse phase corresponding to the target frame in the vertical synchronization signal.

4. The backlight driving method of claim 3, wherein a time difference between the start time of the first active pulse phase and an end time of the second active pulse phase is equal to the second duration.

5. The backlight driving method of claim 1, wherein after determining the second duration based on the maximum period corresponding to the frame at the lowest refresh frequency of the display panel and the first period, to delay the start time of the first active pulse phase based on the second duration, the method comprises:

determining a third duration in the backlight driving signal corresponding to the target frame and corresponding to a first inactive phase before the first active pulse phase, based on a refresh frequency of the display panel; and determining a fourth duration in the backlight driving signal corresponding to the target frame and corresponding to a second inactive phase after the first active pulse phase, based on the third duration, the first duration, and the target duty ratio.

6. The backlight driving method of claim 5, wherein determining the third duration in the backlight driving signal corresponding to the target frame and corresponding to the first inactive phase before the first active pulse phase, based on the refresh frequency of the display panel comprises:

determining the third duration based on a difference between the maximum period and a minimum period corresponding to a frame at a highest refresh frequency of the display panel.

7. The backlight driving method of claim 5, wherein determining the fourth duration in the backlight driving signal corresponding to the target frame and corresponding to the second inactive phase after the first active pulse phase, based on the third duration, the first duration, and the target duty ratio comprises:

determining the fourth duration based on a difference between a ratio of the first duration and the target duty ratio and a sum of the third duration and the first duration.

8. The backlight driving method of claim 1, wherein after determining the second duration based on the maximum period corresponding to the frame at the lowest refresh frequency of the display panel and the first period, to delay the start time of the first active pulse phase based on the second duration, the method comprises:

determining a duration in the backlight driving signal corresponding to the target frame and corresponding to an inactive phase after the first active pulse phase based on a difference between a ratio of the first duration and the target duty ratio and the first duration.

9. A display device, comprising:

a display panel;

a plurality of backlight sources configured to provide the backlight to the display panel; and a control module configured to execute instructions for driving a plurality of the backlight sources, wherein the control module comprises:

at least one processor; and a memory storing the instructions, wherein the instructions when executed by the at least one processor, cause the at least one processor to perform operations, the operations comprising:

determining a first duration of a first active pulse phase in a backlight driving signal corresponding to a target frame of a to-be displayed picture in a display panel, based on a target duty ratio and a first period corresponding to a target previous frame; wherein the target previous frame is a frame preceding the target frame, and the backlight driving signal is configured to drive a backlight of the display panel; and determining a second duration based on a maximum period corresponding to a frame at a lowest refresh frequency of the display panel and the first period, to delay a start time of the first active pulse phase based on the second duration;

wherein after determining the second duration based on the maximum period corresponding to the frame at the lowest refresh frequency of the display panel and the first period, to delay the start time of the first active pulse phase based on the second duration, the operations further comprises:

determining a duration in the backlight driving signal corresponding to the target frame and corresponding to an inactive phase after the first active pulse phase based on a difference between a ratio of the first duration and the target duty ratio and the first duration.

10. The display device of claim 9, wherein determining the second duration based on the maximum period corresponding to the frame at the lowest refresh frequency of the display panel and the first period, to delay the start time of the first active pulse phase based on the second duration comprises:

determining the second duration based on a difference between the maximum period and the first period, to delay the start time of the first active pulse phase based on the second duration.

11. The display device of claim 9, wherein determining the first duration of the first active pulse phase in the backlight driving signal corresponding to the target frame of the to-be displayed picture in the display panel, based on the target duty ratio and the first period corresponding to the target previous frame comprises:

determining the first duration based on a product of the target duty ratio and the first period.

12. The display device of claim 9, wherein before determining the first duration of the first active pulse phase in the backlight driving signal corresponding to the target frame of the to-be displayed picture in the display panel, based on the target duty ratio and the first period corresponding to the target previous frame, the operations further comprises:

determining the first period corresponding to the target previous frame in a vertical synchronization signal based on a second active pulse phase corresponding to the target frame in the vertical synchronization signal.

13. The display device of claim 12, wherein a time difference between the start time of the first active pulse phase and an end time of the second active pulse phase is equal to the second duration.

14. The display device of claim 9, wherein after determining the second duration based on the maximum period corresponding to the frame at the lowest refresh frequency of the display panel and the first period, to delay the start time of the first active pulse phase based on the second duration, the operations further comprises:

determining a third duration in the backlight driving signal corresponding to the target frame and corresponding to a first inactive phase before the first active pulse phase, based on a refresh frequency of the display panel; and determining a fourth duration in the backlight driving signal corresponding to the target frame and corresponding to a second inactive phase after the first active pulse phase, based on the third duration, the first duration, and the target duty ratio.

15. The display device of claim 14, wherein determining the third duration in the backlight driving signal corresponding to the target frame and corresponding to the first inactive phase before the first active pulse phase, based on the refresh frequency of the display panel comprises:

determining the third duration based on a difference between the maximum period and a minimum period corresponding to a frame at a highest refresh frequency of the display panel.

16. The display device of claim 14, wherein determining the fourth duration in the backlight driving signal corresponding to the target frame and corresponding to the second inactive phase after the first active pulse phase, based on the third duration, the first duration, and the target duty ratio comprises:

determining the fourth duration based on a difference between a ratio of the first duration and the target duty ratio and a sum of the third duration and the first duration.

17. A backlight driving method, comprising:

determining a first duration of a first active pulse phase in a backlight driving signal corresponding to a target frame of a to-be displayed picture in a display panel, based on a target duty ratio and a first period corresponding to a target previous frame; wherein the target previous frame is a frame preceding the target frame, and the backlight driving signal is configured to drive a backlight of the display panel; and determining a second duration based on a maximum period corresponding to a frame at a lowest refresh frequency of the display panel and the first period, to delay a start time of the first active pulse phase based on the second duration;

wherein after determining the second duration based on the maximum period corresponding to the frame at the lowest refresh frequency of the display panel and the first period, to delay the start time of the first active pulse phase based on the second duration, the method comprises:

determining a third duration in the backlight driving signal corresponding to the target frame and corresponding to a first inactive phase before the first active pulse phase, based on a refresh frequency of the display panel; and determining a fourth duration in the backlight driving signal corresponding to the target frame and corresponding to a second inactive phase after the first active pulse phase, based on the third duration, the first duration, and the target duty ratio.

18. The backlight driving method of claim 17, wherein determining the third duration in the backlight driving signal corresponding to the target frame and corresponding to the first inactive phase before the first active pulse phase, based on the refresh frequency of the display panel comprises:

determining the third duration based on a difference between the maximum period and a minimum period corresponding to a frame at a highest refresh frequency of the display panel.

19. The backlight driving method of claim 17, wherein determining the fourth duration in the backlight driving signal corresponding to the target frame and corresponding to the second inactive phase after the first active pulse phase, based on the third duration, the first duration, and the target duty ratio comprises:

determining the fourth duration based on a difference between a ratio of the first duration and the target duty ratio and a sum of the third duration and the first duration.

20. The backlight driving method of claim 17, wherein after determining the second duration based on the maximum period corresponding to the frame at the lowest refresh frequency of the display panel and the first period, to delay the start time of the first active pulse phase based on the second duration, the method comprises:

determining a duration in the backlight driving signal corresponding to the target frame and corresponding to an inactive phase after the first active pulse phase based on a difference between a ratio of the first duration and the target duty ratio and the first duration.

* * * * *